United States Patent [19]

Freier

[11] Patent Number: 5,094,299

[45] Date of Patent: Mar. 10, 1992

[54] TOOL, TOOL ASSEMBLY, AND METHODS

[76] Inventor: Jon Freier, 9121 North Center Rd., Neenah, Wis. 54956

[21] Appl. No.: 487,383

[22] Filed: Mar. 2, 1990

[51] Int. Cl.$^5$ .............................................. A01B 59/06
[52] U.S. Cl. ........................................ 172/1; 172/136; 172/443; 172/459
[58] Field of Search ................ 172/34, 136, 245, 253, 172/254, 224, 459, 443, 439

[56] References Cited

U.S. PATENT DOCUMENTS

| 536,949 | 4/1985 | Fay | 172/224 |
|---|---|---|---|
| 1,188,874 | 6/1916 | Alexander | 172/136 |
| 2,830,516 | 4/1958 | Evans et al. | 172/459 X |
| 2,904,350 | 9/1959 | Seng | 172/459 X |
| 3,044,196 | 7/1962 | Kinney | 172/459 |
| 3,295,611 | 1/1967 | Bunting et al. | 172/459 X |
| 3,744,573 | 7/1973 | Mellen | 172/225 |
| 4,073,346 | 2/1978 | Groth et al. | 172/443 X |

FOREIGN PATENT DOCUMENTS

| 1009414 | 5/1957 | Fed. Rep. of Germany | 172/443 |
|---|---|---|---|
| 1109437 | 6/1961 | Fed. Rep. of Germany | 172/224 |
| 1109931 | 6/1961 | Fed. Rep. of Germany | 172/224 |
| 1005020 | 4/1952 | France | 172/459 |
| 1275128 | 9/1961 | France | 172/224 |
| 1285015 | 1/1962 | France | 172/136 |

*Primary Examiner*—Randolph A. Reese
*Assistant Examiner*—Jeffrey L. Thompson
*Attorney, Agent, or Firm*—Thomas D. Wilhelm

[57] ABSTRACT

Equipment for attachment to a vehicle having a three-point hitch. The disclosure discloses a novel implement, and an interface adapted to be interposed between the implement and the hitch. The implement preferably has at least two different sets of working elements. The implement and the interface are preferably adapted to accommodate 180 degree rotation of the implement with respect to an axis extending between the implement and the interface, whereby either set of working elements can be disposed adjacent the ground or other surface to be worked. Rotation of the implement with respect to the axis is prevented while the implement is being used to work the ground.

6 Claims, 4 Drawing Sheets

TOOL, TOOL ASSEMBLY, AND METHODS

BACKGROUND OF THE INVENTION

This invention relates to implements, such as implements joined with a tractor. The invention relates especially to apparatus and methods used to join the implement to the tractor, and to manipulate the joining with respect to the tractor.

The invention as a whole is most closely related to joining of implements to a tractor having a conventional three-point hitch, including a pair of lower hitch arms, and an upper hitch arm. The lower hitch arms are typically permanently mounted to the tractor, and are powered by an hydraulic system whereby the distal ends of the lower arms are raised or lowered. The upper hitch arm is typically not powered. Its distal end is free to be raised or lowered along with the raising or lowering of the implement, which is joined to the tractor, by the lifting power transmitted through the lower hitch arms.

The three-point hitch generally utilizes three joining elements near the distal ends of the three hitch arms for joining with three corresponding joining elements on the implement, whereby the operating hitch uses 3 pairs of joined joining elements. The three joining elements on the hitch arms typically comprise holes extending through the hitch arms. When joined, the three pairs of joined elements, two lower pairs and one upper pair, define a plane, through the three loci of joinder, which plane more or less approaches a perpendicular with the ground.

Allowing for variations between equipment manufacturers, the upper pair of joined elements, at the distal end of the upper hitch arm, is generally about 8 inches to about 16 inches above a straight line connecting the two lower pairs of joined elements, and defines at least a part of the top of the implement. Accordingly, implements designed to be joined with the tractor, using a three-point hitch, conventionally employ an upper joining means element which is similarly positioned about 8 inches to about 16 inches above a straight line connecting the two lower joining means elements on the implement. Typically, the upper joining means element, and structural members connected to it, represent and define at least part of the top of the implement.

It is an object of this invention to provide an implement interface for use between the implement and the tractor wherein the interface includes structural members extending between members defining the front and rear of the interface.

It is another object to provide an implement interface having rear joining means elements, adapted to be joined with an implement, which joining means elements, as a group, are symmetric with respect to an imaginary plane having a substantially horizontal longitudinal axis extending from the front of the interface to its rear.

Yet another object of the invention is to provide an implement interface which accommodates 180 degree rotation of an implement with respect to the interface.

Still another object is to provide an implement interface adapted to accommodate 180 degree rotation at a first position of engagement between the implement and the interface, and to prevent rotation at a second position of engagement.

Another object of the invention is to provide novel implements which accommodate 180 degree free rotation of the implement about an axis extending between the implement and the vehicle.

It is another object of the invention to provide an implement which has two or more sets of working elements, which sets of working elements have different types of working surfaces for working the ground at different times, in non-concurrent steps.

Still another object is to provide an implement, for attachment to a vehicle having a three-point hitch, through an implement interface, wherein none of the joining means on the implement comprise the sole definition of any part of the top of the implement.

Another object is to provide a tool assembly comprising an implement interface having front and rear joining means, and an implement joined to the interface and adapted to accommodate rotation of the implement with respect to the interface.

Another object is to accommodate such rotation in the tool assembly about an axis of rotation, which axis extends from the implement toward the front of the interface.

Still another object is to provide a method of coupling, to a vehicle having a three-point hitch, an implement having joining means not adapted to be coupled directly to the three-point hitch, by interposing an appropriate implement interface between the implement and the three-point hitch.

Another object is to provide a method comprising coupling an implement interface to a three-point hitch and coupling an implement to the implement interface.

A further object is to provide a method to release an implement from securement to an implement interface, to rotate the implement about 180 degrees with respect to the interface, and to re-secure the implement to the interface, all while maintaining at least partial engagement between the implement and the interface.

SUMMARY OF THE INVENTION

Some of the objectives are achieved in a first family of implement interfaces. The first family of interfaces comprises one or more first frontwardly disposed members defining the front of the implement interface, first upper and lower front joining means elements, comprising front joining loci, the front joining loci, in combination, being adapted, to detachably join the implement interface with a vehicle. The combination of the front joining loci is contained in a first generally upstanding plane during normal joinder to the vehicle.

One or more second rearwardly disposed members define the rear of the implement interface. Rear joining means elements comprise rear joining loci. The rear joining loci, in combination, are adapted to detachably join the implement interface with an implement. Third structural members extend between, and connect, the front joining means elements and the rear joining means elements. In some embodiments, in this family of interfaces, ones of the third structural members define a plane having an indefinite length and an indefinite width, the rear joining means elements being closer to the plane than at least one of the front joining means elements, typically the upper ones of the front joining means elements. Preferably the rear joining means elements comprise at least three joining means elements defining a straight line. In some embodiments, the rear joining means elements comprise at least three joining means elements defined in a common, substantially horizontal, plane. Preferably, one of the rear joining means elements is adapted to join with a corresponding and cooperating joining means element, and respectively, on an implement, and to accommodate 180 degree rotation of the corresponding joining means element, and respectively, the implement with respect to the one rear joining means element on the implement interface, when the one joining means element on the interface, and the corresponding joining means element on the implement are joined.

Others of the objectives are achieved in a second related family of implement interfaces. The second family of interfaces comprises one or more first frontwardly disposed members defining the front of the implement interface. First upper and lower front joining means elements comprise front joining loci, the front joining loci, in combination, being adapted to detachably join the implement interface with a vehicle. One or more second rearwardly disposed members define the rear of the implement interface. Rear joining means elements comprise the rear joining loci. The rear joining loci, in combination, are adapted to detachably join the implement interface with an implement. The interface has a central longitudinal axis extending between its front and its rear. The rear joining means elements are disposed in a symmetrical arrangement with respect to a plane containing the central longitudinal axis. Preferably, the rear joining means elements are defined in a plane containing the central longitudinal axis. In some embodiments, one of the rear joining means elements is adapted to join with a corresponding and cooperating joining means element on an implement, and to accommodate 180 degree rotation of the corresponding joining means element and thereby the implement, with respect to the one rear joining means element on the interface, when the one joining means element on the interface, and the corresponding joining means element on the implement, are joined.

Preferably, the one rear joining means element, on the interface, comprises an elongate circular member adapted to join with the cooperating joining means element on the implement, in accommodation of rotation of the implement and the respective cooperating joining means element on the implement with respect to the one rear joining means element on the interface.

Still others of the objectives are achieved in a third related family of implement interfaces. The third family of implement interfaces comprises a front, comprising one or more first forwardly disposed members, upper and lower front joining means elements comprising front joining loci, the front joining loci, in combination, being adapted to detachably join the implement interface with a vehicle, a rear comprising one or more second rearwardly disposed members, rear joining means elements, and one or more third structural members. The third structural members are joined with ones of the first joining means elements and ones of the second joining means elements. The third structural members extend between the ones of the first joining means elements and the ones of the second joining means elements, along an imaginary generally planar surface containing both the rear joining means elements and the lower front joining means elements. Preferably, the rear joining means elements are closer to the surface than at least one of the front joining means elements.

Yet others of the objectives are achieved in a fourth related family of implement interfaces. The fourth family of implement interfaces comprises one or more first forwardly disposed structural members defining front joining means elements, comprising front joining loci, the front joining loci, in combination, being adapted to detachably join the implement interface with a vehicle, and one or more second rearwardly disposed structural members defining rear joining means. The rear joining means comprises rear joining means elements. Each of the rear joining means elements comprises a rear joining locus (e.g. holes which can be pinned). The rear joining loci, in combination, are adapted to detachably join the implement interface with an implement. The implement interface is adapted (i) to receive an implement into a first position of engagement with the rear joining means, and to accommodate rotation of the implement with respect to the implement interface while the implement is in the first position of engagement with the rear joining means, and (ii) to receive the implement into a second position of engagement with the interface wherein the implement is prevented from rotating with respect to the implement interface.

Others of the objectives are achieved in a first family of implements. The first family of implements comprises a frame, one or more working elements attached to the frame, and a rotation member adapted to engage receiving means attached to the vehicle, and to accommodate 180 degree free rotation of the implement, at a first position of engagement, with respect to a central axis extending between the implement and the vehicle. The implement preferably includes joining means, adapted to join with cooperating joining means attached to the vehicle, through an interface, to thereby prevent rotation of the implement with respect to the vehicle, at a second position of engagement.

Preferably, the rotation member, on the implement, and the joining means, attached to the vehicle, are cooperatively adapted such that (i) the rotation member can be partially engaged with the receiving means without joinder of the joining means, on the implement, with the cooperating joining means attached to the vehicle, whereby the implement can be rotated 180 degrees with respect to the vehicle, and such that (ii) the rotation member can be fully engaged with the receiving means, on the implement with accompanying joinder of the joining means, on the implement, with the respective cooperating joining means attached to the vehicle, whereby the implement is prevented from rotating with respect to the vehicle. Preferably the rotation member and the joining means on the implement are also cooperatively adapted such that when the implement is joined with the vehicle by means of the joining means on the implement, and the cooperating joining means, attached to the vehicle, and wherein the rotation member is engaged with the receiving means attached to the vehicle, the joining means on the implement can be released from the cooperating joining means, attached to the vehicle, whereupon (i) the implement can be moved rearwardly of the vehicle while maintaining a partial engagement of the rotation member with the receiving means attached to the vehicle, and (ii) the implement can be rotated 180 degrees with respect to the vehicle while the rotation member is partially engaged with the receiving means attached to the vehicle.

Preferably, the implement includes first and second working elements mounted in the implement, the first and second working elements having respective first and second directions of orientation with respect to the rotation member, and comprising corresponding first and second working surfaces thereof. The working surfaces of the first working element are different from, and spacially separated from, the working surfaces of the second working element.

Preferred embodiments of the implement further comprise means adapted to accommodate orienting the first working elements by (i) accommodating free rotation of the implement through an arc of up to at least 180 degrees to thereby bring the first working elements into proximate relationship with the ground surface, or other surface to be worked, and (ii) stopping the free rotation when the first working elements are in proximate relationship with the ground surface to be worked, whereby normal vertical control of the implement can be effected, by the conventional hydraulically actuated three-point hitch on the vehicle, to apply the implement to the ground to be worked, and to thereby work the ground.

Still others of the objectives are achieved in a second related family of implements. The second family of implements comprises a frame, and first and second working elements secured to the frame. The first and second working elements comprise corresponding first and second working surfaces thereon. The working surfaces of the first working elements are different from, and separated from, the working surfaces of the second working elements.

Preferably, this family of implements also includes means adapted to accommodate rotating at least a portion of the implement, and thereby orienting the first working elements. This is achieved by accommodating free rotation of the implement, in normal use orientation thereof, through an arc of up to at least 180 degrees with respect to an axis of rotation which defines an angle of less than 45 degrees with the ground.

In some embodiments of the implement, the first and second working elements are attached to separate tool bars. The tool bars can be removably attached to the frame, whereby the first tool bar, comprising the first working elements can be removed from the implement, by the user thereof, and another tool bar, comprising another set of working elements, can be attached to the implement, by the user, in place of the removed tool bar.

Yet other objectives are achieved in a third related family of implements. The third family of implements, for use with a prime-mover vehicle having a three-point hitch, the three-point hitch having at least one lower hitch joining means and at least one upper hitch joining means, whereby the hitch is adapted to be joined with an implement having at least one corresponding upper hitch joining means, comprises a bottom, a top, and a plurality of structural elements defining structural joining means adapted to attach the implement to a prime mover vehicle through an implement interface. None of the structural joining means comprise the sole definition of any portion of the top of the implement.

Still others of the objectives are achieved in tool assemblies comprising, in combination, the above implement interfaces joined to the three-point hitch of the vehicle, and the above implements joined with the implement interface at the rear of the interface. Accordingly, the implement interface is thus interposed between the three-point hitch and the implement.

In preferred embodiments of the tool assembly, when the cooperating joining means on the implement and the implement interface exclusive of rotating joining means elements, are released respectively from each other, the implement can be spaced from the implement interface while maintaining at least partial engagement of rotating joining means elements and can be rotated at least 180 degrees about the implement interface by means of rotation of the rotating joining means elements on the implement and the implement interface, with respect to each other. Preferably, the rotating joining means elements define a central axis of rotation.

Cooperating joining means elements on the implement interface can then be joined and secured to thereby prevent rotation of the implement with respect to the implement interface.

Yet other objectives of the invention are achieved in methods of attaching an implement to a prime mover vehicle having a three-point hitch. The methods comprise, in general, interposing, between the vehicle and the implement, an implement interface, as described herein.

The invention still further comprises methods of using equipment. The methods comprise joining the interface to a vehicle, joining one of the implements to the interface, including aligning one or more cooperating pairs of joining means elements on the implement and the interface, moving one of the implement and the implement interface toward the other, and securing the cooperating joining means to each other.

Some embodiments of the method further comprise the steps of releasing the securement between the cooperating joining means elements, moving at least one of the implement and the implement interface away from the other, thereby separating the cooperating joining means elements, rotating the implement about the axis of rotation, and thereby aligning a second pair of cooperating joining means elements, the second pair comprising no more than one of the elements of the first pair of joining means elements, moving one of the implement and the implement interface toward the other to thereby join the joining means elements of the second pair, and securing the joinder between the second pair of joining means elements.

DETAILED DESCRIPTION OF THE ILLUSTRATED EMBODIMENTS

Figure 1:
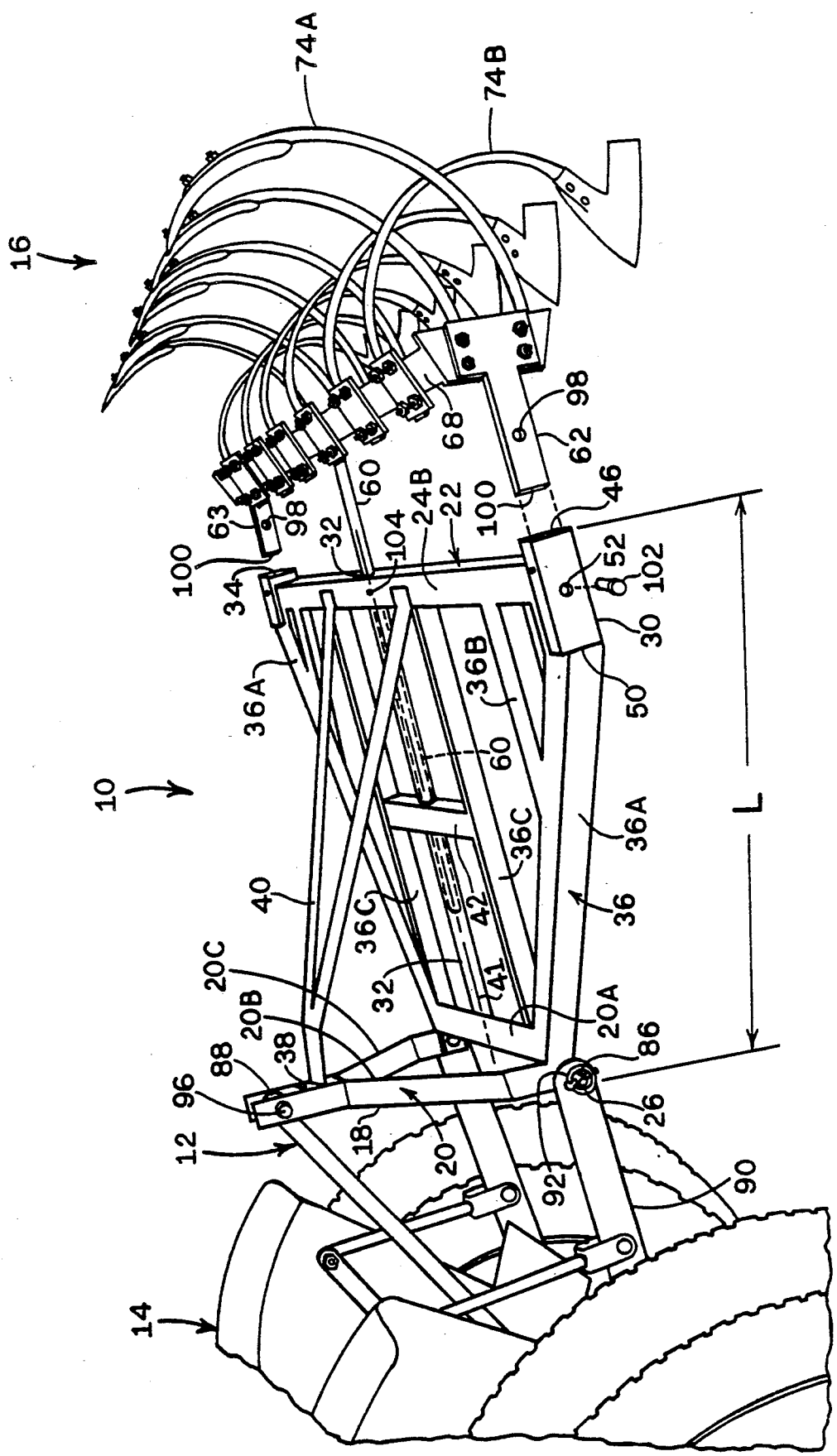
FIG. 1 shows a pictorial view of a tool assembly of this invention, including an implement interface, interposed between a 3-point hitch on a tractor and a first embodiment of implements of this invention.
Figure 3:
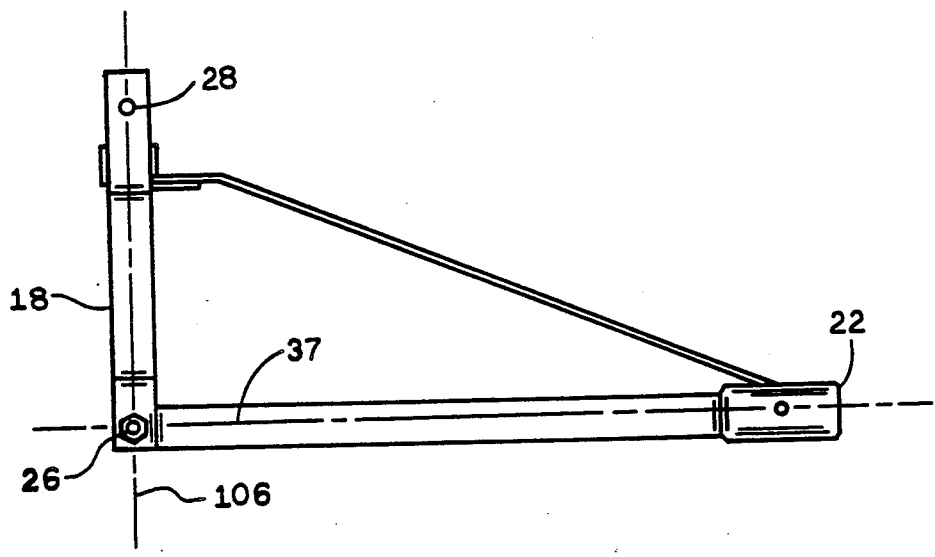
FIG. 3 shows a side view of an implement interface of the invention.

FIG. 1 shows an implement interface 10 interposed between a three-point hitch 12, on a tractor 14, and an implement 16. Interface 10 has a front 18, defined generally by frontwardly disposed members 20A, 20B, and 20C; and a rear 22, defined generally by rearwardly disposed members 24A, 24B, and 24C. Adjacent front 18 of the interface, on frontwardly disposed members 20, are two lower front joining elements comprising pins 26 and an upper front joining element comprising a pair of holes 28 in upstanding left and right front arms 29, which front arms comprise frontwardly disposed members 20B and 20C. At the rear 22 of the interface 10, on rearwardly disposed members 24A, 24B, and 24C, are three rear joining elements 30, 32, and 34, disposed in a straight line. Left and right lower structural members 36A define the left and right sides of the interface, and extend between front member 20A and rear member 24B. Lower structural members 36C extend between structural members 36A and rear member 24B. Lower structural members 36C extend between front member 20A and rear member 24B. Typical attachment for structural members 36A, 36B, and 36C, at opposing ends is by welds, not shown. Structural members 36A, 36B, and 36C define a substantially horizontal planar surface 37, seen in edge view in FIG. 3. Planar surface 37 contains joining elements 26, 30, 32, and 34.

Front and rear brackets 38 on interface 10 secure left and right front arms 29 to each other, adjacent, and somewhat below, holes 28 in arms 29. A V-shaped top strap structure 40 is secured to rear bracket 38 and extends to, and is secured at its two distal ends to, rear structural member 24B.

Figure 2:
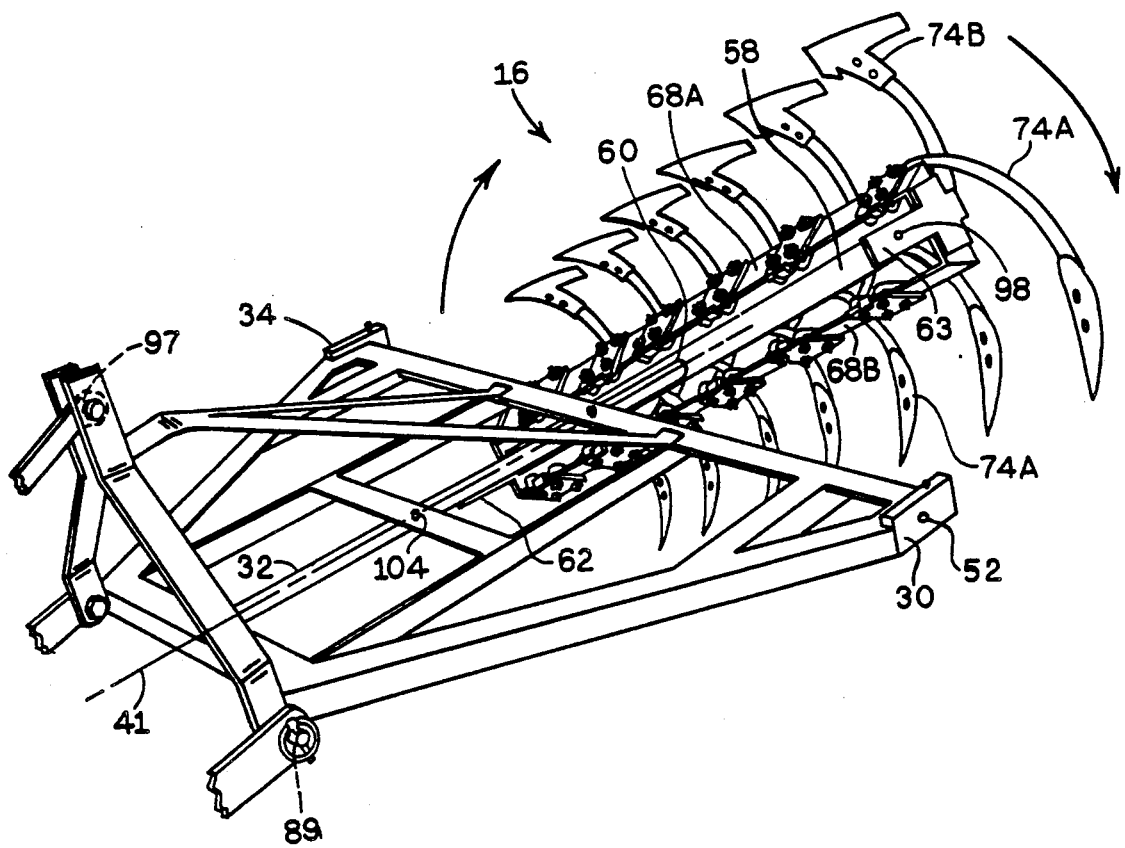
FIG. 2 shows the tool assembly of FIG. 1 near completion of a 180 degree rotation.

Rear joining element 32 typically is constructed using round tubing such as, for example, steel pipe. As seen in FIGS. 1 and 2, rear joining element 32 extends forwardly of the rear 22 of the interface, along a central longitudinal axis 41, in planar surface 37, substantially to the front of the interface, for reasons explained more fully hereinafter. As illustrated, rear joining element 32, in the form of a steel pipe, is supported at the front of the interface by member 20A, and is supported intermediate front 18 and rear 22 by crossing intermediate structural member 42. The steel pipe of rear joining element 32 is hollow; namely it has a hole 44 extending along substantially its full length, whereby a cooperating joining element on an implement can be received in joining element 32, preferably along the entire length of the interior of joining element 32; whereby joining element 32 is also referred to herein as receiving means 32.

Rear joining elements 30 and 34 are preferably fabricated using rectangular tubing, whereby elements 30 and 34 comprise holes 46 and 48 respectively, defining those joining elements as female joining elements. Referring now to FIG. 1, rear joining element 30, on the left side of interface 10, extends from the rear opening of hole 46 forwardly to weld 50 where the rectangular tubing of joining element 30 is secured to structural member 36. Accordingly, hole 46 extends forwardly in the tubing to weld 50. Hole 52 extends through the near sidewall (FIG. 1) of the rectangular tubing as shown. A corresponding hole 54 on the opposing sidewall of the rectangular tubing is aligned with hole 52. Rearwardly disposed member 24A, which comprises joining element 30, is secured to rearwardly disposed member 24B by a weld, not shown.

Rearwardly disposed member 24C, on the right side of the interface 10, is structurally the same as rearwardly disposed member 24A. It correspondingly comprises joining element 34, and is attached to respective members 24B and 36A in the same manner.

Figure 6:
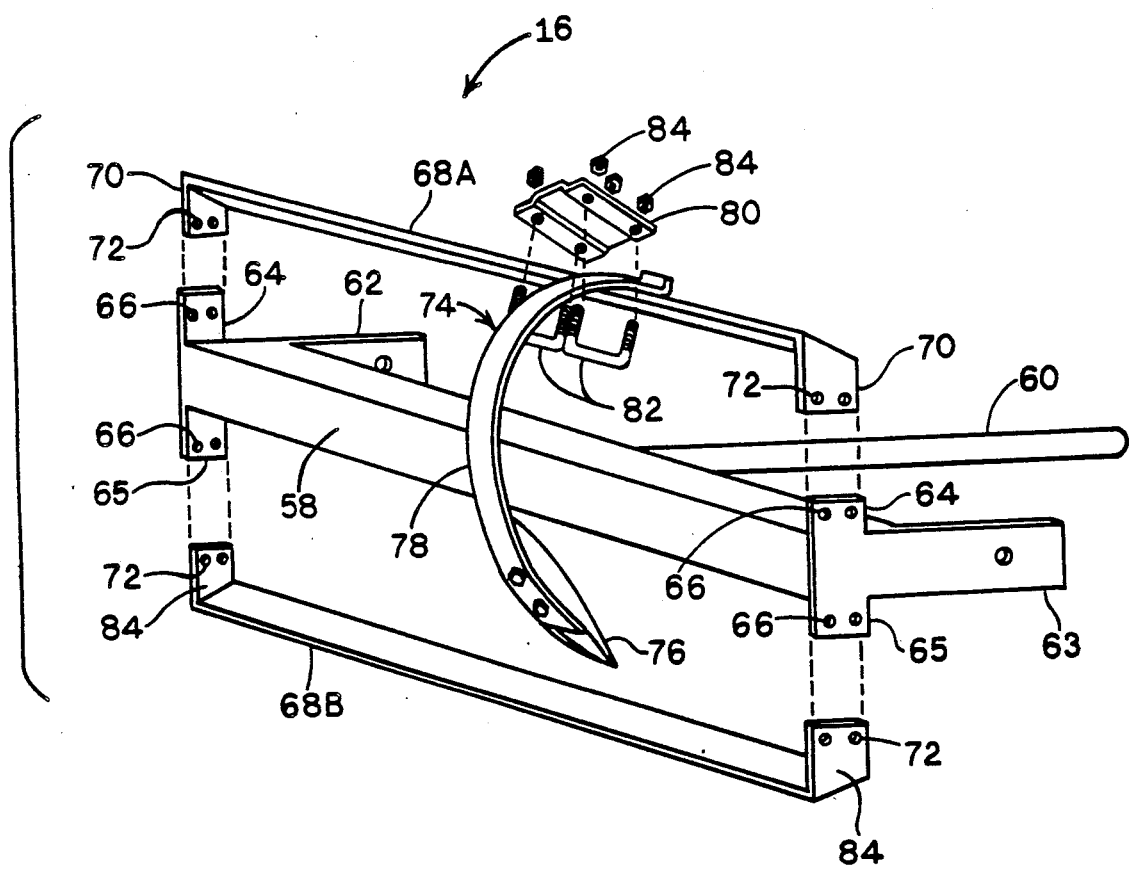
FIG. 6 shows a rear pictorial exploded diagram of a second embodiment of implements of this invention, with parts missing.

Referring now to FIG. 6, implement 16 comprises a primary frame bar 58 extending across the width of the implement. Extending frontwardly of the implement, from the front of primary frame bar 58, and as seen in FIG. 2, is rotation member 60. Preferably rotation member 60 is a solid round shaft, for example 1 inch in diameter and 36 inches long. Joining elements 62 and 63 extend forwardly of primary frame bar 58 on opposing ends of the bar. Flanges 64 and 65 extend up and down respectively from primary bar 58, and include holes 66.

Working elements bar 68A extends across the top of primary bar 58, and is shown displaced upwardly from bar 58 in FIG. 6. Flanges 70 on either end of bar 68A extend toward primary bar 58. Holes 72 in flanges 70 are positioned to align with corresponding holes 66 on flanges 64, when working elements bar 68A is moved into the mounting position wherein flanges 70 on bar 68A are positioned adjacent flanges 64. Bolts or similar joining elements are then inserted through holes 66 and 72 whereby the working elements bar 68A is secured to the primary frame bar 58.

A plurality of working elements is attached to working elements bar 68A. The attachment of a single working element is illustrated in FIG. 6. Plural working elements are seen in FIGS. 1 and 2.

Referring now to FIG. 6, working element 74 comprises a relatively narrow hoe 76 as its working surface, and a spring shank 78, to which it is mounted by a pair of bolts. Shank 78 is secured to working elements bar 68A by clamping it between a clamp bracket 80 on one side of bar 68A and a pair of U-bolts 82 on the other side of bar 68A, with the shank 78 trapped, and held, between bar 68A and bracket 80. Bracket 80 is secured on bolts 82 using nuts 84. While the securement of one working element 74 to bar 68A is shown and illustrated, a plurality of working elements 74 is typically mounted on bar 68A. A second working elements bar 68B is attached to primary frame bar 58 at flanges 65 and corresponding holes 66.

Working elements bars 68A and 68B are adapted to receive a variety of different working elements 74. Typically, a plurality of working elements are mounted on a given bar 68A or 68B in order to make up a set of working elements mounted thereon, and wherein all of the working elements so mounted on the bar at a given time, to make up a set of working elements, are normally the same.

The working elements 74 can be mounted on bar 68A while bar 68A is mounted to the primary frame bar 58. Alternatively, working elements 74 can be mounted to bar 68A while bar 68A is separated from bar 58. Accordingly, the subassembly of bar 68A and working elements 74 can be prepared, ahead of time, for quick assembly to primary bar 58 by the securing of only 4 bolts through holes 66 and 72.

Similar working elements bar 68B is adapted to similarly receive a plurality of working elements, and to be mounted to primary frame bar 58 by bolts through holes 72 in flanges 84 and holes 66 in flanges 65. Typically, the working elements on two bars 68A and 68B, mounted on a given frame bar 58 at a given point in time, represent two different sets of working elements. Referring to FIG. 2, the working elements 74A which are mounted to bar 68A all have the same narrow hoes, and are different from the working elements 74B (wider plows) which are mounted to bar 68B. In the alternative, a set of working elements mounted on a bar can contain differing working elements.

FIG. 6 illustrates a highly versatile implement assembly, wherein a plurality of working element bars 68 can be assembled with working elements ahead of time, the sets of working elements on the plurality of bars 68, differing from each other. In that regard, the working elements on an implement can then be quickly changed by removing the 4 bolts in the corresponding flanges 64 or 65, removing that bar assembly (bar 68 plus working elements 74), and installing a bar 68 having a differing set of working elements mounted to it. Accordingly, the working element set has been reduced, in this invention, to an easily replaceable subassembly, whereby a plurality of sets of a variety of working elements can be used sequentially on a single implement frame, and whereby the operator can readily change the sets on the implement.

FIGS. 1 and 2 show narrow hoes 74A and wider plows 74B. Each such set represents a set of working surfaces adapted to be applied to working the ground as a set. Either or both such sets could be replaced with another set of a different type of working element, for example, rake elements or the like, all using the same primary frame.

The dimensions, and to some extent the structure, of bar 68 can vary to facilitate mounting conventional working elements thereon. But each bar 68 will have flanges 70, for mounting to primary frame bar 58, or some equivalent means for mounting bar 68 to bar 58.

Referring now to FIGS. 1 and 2, the tool assembly comprises the interface 10 interposed between the implement 16 and the three-point hitch 12 of tractor 14. The front or forward end 18 of interface 10 is detachably mounted to the three-point hitch 12 of tractor 14 by means of (i) lower front joining element pins 26 which are received in holes 89 in tractor lift arms 90 at loci 86 and (ii) upper front joining elements 28 at loci 88. Lower front joining element pins 26 are secured in holes 89 of to the tractor lift arms 90 by conventional spring pins 92. Upper joining elements 28 are secured to upper arm 94 of the three-point hitch 12 by passing a conventional hitch pin 96 through holes 28, and a corresponding hole 97 in upper arm 94. Thus, by means of such securement at loci 86 and 88, the interface can be raised and lowered by the conventional raising and lowering of lift arms 90 which are powered by the hydraulic system on the tractor 14.

As the interface is raised and lowered about the conventional center of rotation on the tractor, planar surface 37 also rotates about the center of rotation, whereby it defines the small angle with the horizontal which is usually defined by horizontal frame members of conventional 3-point hitch implements. Such angle is typically about 10 degrees to about 20 degrees. All angles less than 45 degrees from the horizontal, preferably less than 30 degrees, are contemplated, and generally describe an extension of the angle defined between arms 90, of the tractor, and the horizontal surface on which the tractor is supported. Arms 90 conventionally define a variety of such angles as they are raised and lowered, and all such angles are hereby included within the definition of the substantially horizontal attitude of planar surface 37.

Referring now to FIG. 1, the joining elements 30, 32, and 34, on the rearward end of interface 10, are adapted to receive corresponding respective joining elements 62, 60, and 63 of implement 16. Within the generic context of the joining elements, joining element 32 is a receiving means which is especially adapted to receive the corresponding joining element 60 of the implement, also referred to as the rotation member. In the position shown in FIG. 1, wherein the overall length "L" of the interface is about 36 inches, and wherein the length of rotation member 60 is about 36 inches, the rotation member 60 is partially, but substantially, received in, and engaged with, rear joining element 32, which extends to structural member 20A at the front of the interface. Accordingly, in the position shown in FIG. 1, implement 16 is being supported, off the ground, completely and solely by rotation member 60. The weight of implement 16 is substantially equally distributed on both sides of rotation member 60. With rotation member 60 being a round shaft, and being received in the elongated cylindrical bore of round pipe of receiving joining element 32 which is disposed substantially centrally of interface or implement connecting means 10 and extends longitudinally thereof, as seen in FIGS. 1 and 2, and there being no other restraint between implement 16 and interface 10, implement 16 is thus free to rotate about interface 10 by means of rotation of rotation member 60 in receiving joining element 32. If the implement should impact the ground during rotation, the entire tool assembly is readily lifted an appropriate height to clear the ground by lifting with the hydraulically powered 3-point hitch (lower arms 90) of the tractor. Referring to FIG. 1, the wider plows 74B are disposed downwardly, toward the ground. As seen in FIG. 2, the implement has been rotated almost 180 degrees (counterclockwise as viewed from the rear), such that the narrower hoes 74A are down. Thus is the implement freely rotated about interface 10 when in the partially engaged position shown in FIGS. 1 and 2.

Figure 4:
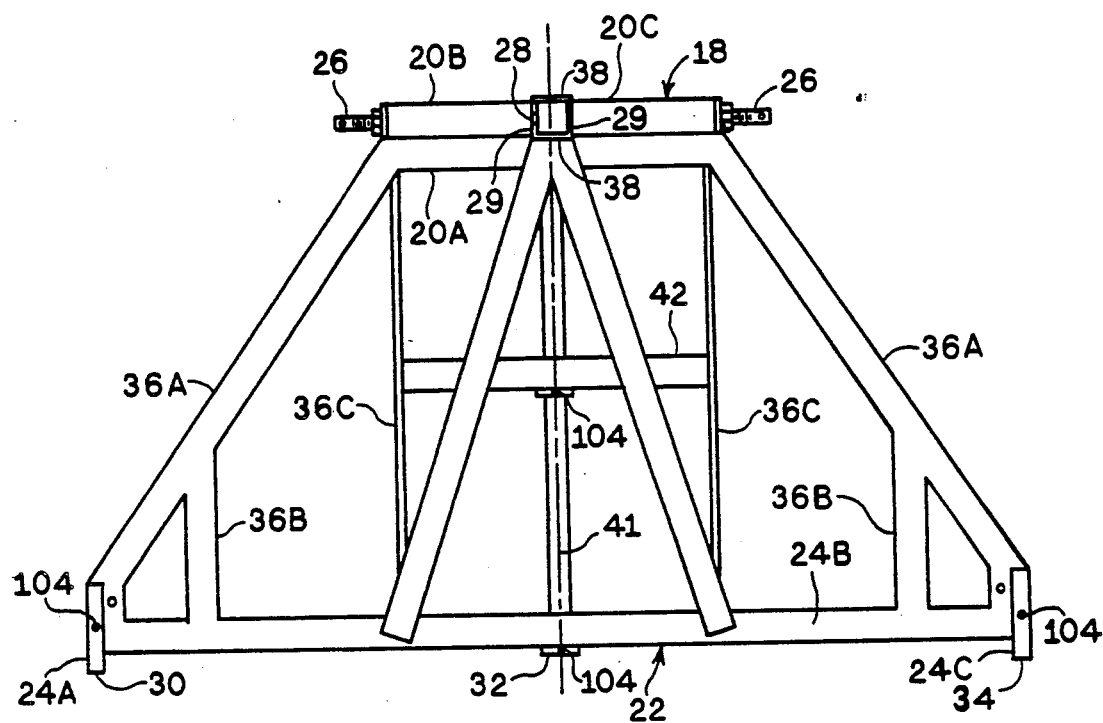
FIG. 4 shows a top view of an implement interface of the invention.
Figure 5:
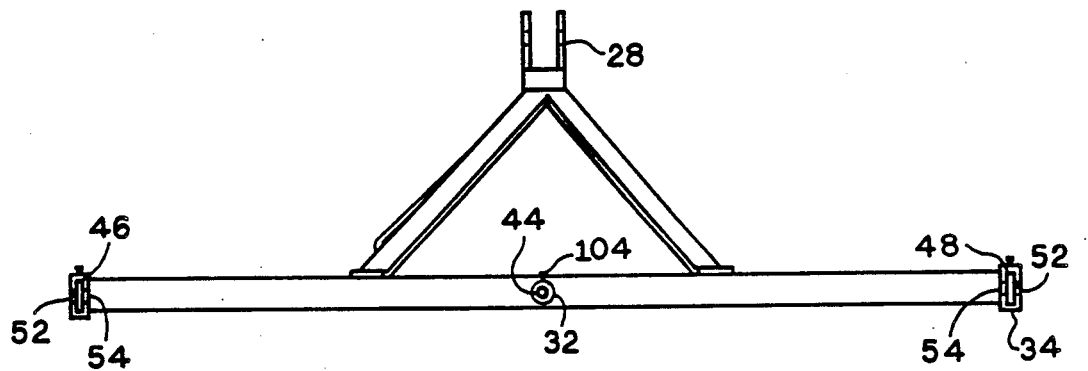
FIG. 5 shows a rear view of an implement interface of the invention.

In order to apply the working surfaces which are disposed adjacent the ground, all of joining elements 30, 32, 34, 60, 62, and 63 should be fully engaged. As best seen in FIG. 4, the joining elements or connectors 30, 34 of the interface are symmetrically laterally disposed with respect to the central receiving means 32. These joining elements are engaged as follows.

As seen in FIG. 1, rotation member/joining element 60 is already partially engaged/received in receiving member/joining element 32. Joining elements 30 and 62, and joining elements 34 and 63, are simultaneously aligned as two respective aligned pairs of joining elements. From this position, the entire implement 16 is pushed toward interface 10 while maintaining the alignment of the respective pairs of joining members 30 and 62, and 34 and 63. As implement 16 is moved toward interface 10, rotation member 60 slides further into receiving means/joining element 32, male joining element 62 is received into engagement with female joining element 30, and male joining element 63 is received into engagement with female joining element 34. Implement 16 is moved toward interface 10 until holes 98 on joining elements 62 and 63 are aligned with the corresponding holes 52, 54, on the corresponding ones of joining elements 30 and 34. For ease of alignment of the holes, joining elements 30 and 34 are provided with rear walls, not shown, adjacent welds 50, which rear walls are abutted by the ends 100 of joining elements 30 and 34 shortly after holes 98 pass central alignment with holes 52, 54. If holes 98 pass central alignment with holes 52, 54, ends 100 abut the rear walls while the holes are still partially aligned, whereby full alignment is readily restored with minor shifting of the joining elements 62, 63. With the holes 98 thus aligned, whereby each pair of joining elements, 30 and 62, 32 and 60, and 34 and 63, is fully engaged, a conventional hitch pin 102 is inserted through holes 52, 98, and 54 at each pair of joining elements, 30 and 62, and 34 and 63. An appropriate and conventional pin retainer, such as a spring pin 92, is applied to each such hitch pin 102 in conventional manner. Accordingly, the respective joining elements are joined together at the respective engaged joining elements, and are secured by pins 102 and 92, whereby the implement 16 is secured to the interface 10.

With the joining elements thus fully engaged and elements 30 and 34 pinned, the tool assembly is ready for use. In use both the lifting force of the tractor, and the pulling force of the tractor, are transmitted from the three point hitch to the interface 10 by pins 86 and 96. Lifting force is transmitted from interface 10 to implement 16 by the engagement of cooperating surfaces of the respective pairs of joining elements, namely 30 and 62, 32 and 60, and 34 and 63. Pulling force of the tractor is transmitted from interface 10 to implement 16 through pins 102, as pins 102 engage the sides of the corresponding holes 52, 54, and 98.

Both interface 10 and implement 16 are responsive to the conventional raising and lowering of the three-point hitch 12 on tractor 14, whereby the interface and implement are readily raised and lowered in the same manner as a conventional implement which is adapted to be attached directly to the three-point hitch 12. Accordingly, the operator can use the tool assembly of interface 10 and implement 16 in the field in the same way he would use a conventional implement. The implement, as shown in FIG. 1, could be used, for example, for weed cultivation, or to generally break up the soil surface with plows 74B. If, on the other hand, a deeper penetration of the soil is desired, implement 16 is readily adapted to bring the narrower hoes 74A into engagement with the soil surface, by rotating the implement 180 degrees about axis 41.

To accomplish the rotation, pins 102 first are removed thereby releasing the securement between interface 10 and implement 16. With the implement lifted off the ground, as held up by the 3-point hitch, the implement is pulled rearwardly of the interface by the operator, until the joining elements 62, 63 on the implement are clear of the respective joining elements 30, 34 on the interface as shown in FIG. 1. The rearward movement of implement 16 is accomplished by a sliding of rotation member 60 with respect to receiving means 32, from full engagement with receiving means 32 into partial engagement. As seen in FIG. 1, the only engagement between implement 16 and interface 10, during such partial engagement, is the partial engagement of rotation member 60 and receiving means/joining element 32. Since the implement is generally balanced left-to-right with respect to rotation member 60, implement 16 is more or less stable in the position shown in FIG. 1, and is free to rotate in either direction, clockwise or counter clockwise without mechanical impediment of the rotation, or mechanical control of the rate or amount of rotation. Suitable lubrication is applied at each of the female joining elements 30, 32, and 34, to accommodate the sliding reception of the corresponding male joining elements 62, 60, and 63. Such lubrication is, for example, applied using conventional grease fittings 104. With appropriate lubricant thus applied, implement 16 can readily be rotated by the operator by applying a modest amount of manual rotating force to the implement on either end of the implement. This begins the rotation. The normal modest frictional resistance to rotation, in the presence of the grease lubrication, effects a modest braking action during the mechanically unimpeded free rotation. Thus, the amount of rotation can be readily controlled by applying a modest manual rotational force until the desired amount of rotation is achieved. The rotation is then stopped by the residual friction between lubricated joining elements 32 and 60.

As viewed from the rear, the implement in FIG. 2 has been rotated counter clockwise, from the position shown in FIG. 1. The arrows in FIG. 2 show the direction of rotation. The rotation is effected by means of rotation of rotation member 60 with respect to receiving means 32. The rotation is continued until joining element 63 is aligned with joining element 30, whereby joining element 62 is also aligned with joining element 34. The rotational force is then released, and minor corrections in the rotation are made, as necessary, to assure alignment of the respective joining elements 30 and 62, and 34 and 63. The operator then pushes the implement toward interface 10 while maintaining the alignment of the respective joining elements 63 with 30, and 62 with 34. The moving of the implement toward the interface is accompanied by the sliding of rotation member 60 into further engagement with receiving means 32. Such sliding movement is facilitated by the action of the applied lubricant. As implement 16 is moved toward interface 10, joining element 63 is received into engagement with joining element 30 and joining element 62 is received into engagement with joining element 34. The implement is pushed into full engagement, whereupon pins 102 are secured through corresponding holes 52, 98, and 54. The implement is then ready for use, applying hoes 74A to the soil to be worked.

In an illustrative sequential use of differing sets of working elements, the implement is first used in the orientation shown in FIG. 1, already plows 74B are applied to the working of the soil surface. Typically, such plows are used at shallow depth, for example to destroy weed growth. After such shallow working, the implement is rotated 180 degrees, whereby hoes 74A are applied to the working of the soil, typically at a deeper depth such as for soil aeration.

The implement 16 can be detached from the interface 10 by pulling pins 102 and pulling the implement rearwardly until rotation member 60 is completely removed from receiving means 32. Joining elements 62 and 63 will, in the same process, be removed from joining elements 30 and 34. Accordingly, the rear joining elements on the interface detachably join the interface with the implement.

Axis of rotation 41, and the corresponding joining element 32, are in the planar surface 37, along with joining elements 30 and 32.

As illustrated in FIG. 1, the top of the implement 16 is defined by hoes 74A. None of the joining elements 60, 62, or 63 comprise sole definition of any portion of the top of implement 16. Similarly, after completion of the 180 degree rotation illustrated in FIG. 2, the top of the implement 16 is defined by plows 74B. Again, none of the joining elements comprise sole definition of any portion of the top of implement 16 when it is disposed in an attitude adapted for full engagement of the respective joining elements, or for engagement of working elements with the ground, and working thereof.

The front joining elements 26 and 28 on interface 10 generally define an upstanding plane 106 and represent normal engagement with a conventional 3-point hitch.

In using the apparatus of the invention, the interface is typically first joined to the tractor, or other vehicle. The implement is then joined to the interface as described. To rotate the implement, the securement at pins 102 and the respective joining elements 30 and 34 is released. The implement and interface are moved apart. The implement is then rotated. The implement and interface are pushed back together, joining joining elements 30 and 34 with respective ones of joining elements 62 and 63, whereby further rotation is prevented during the joinder of joining elements 30 and 34 with corresponding joining elements 62 and 63. The joining elements are then secured using pins 102, whereby the implement is again ready for use.

Joining elements 30 and 34 can be re-positioned outside planar surface 37, so long as they are symmetric with a plane that contains axis 41. Similarly, each of joining elements 30 and 34 could be replaced with a pair of joining elements. The critical structure is that which will allow engagement of corresponding joining elements (e.g. 30, 34 on the interface) with corresponding joining elements on implement 16, after the rotation of the implement.

The invention thus provides an implement interface for use between the implement and the tractor wherein the interface includes structural members extending between members defining the front and rear of the interface.

The invention further provides an implement interface having rear joining elements, adapted to be joined with an implement, which joining elements, as a group, are symmetric with respect to an imaginary plane, or planar surface, having a central longitudinal axis extending from the front of the interface to its rear.

Still further, the invention provides an implement interface which accommodates 180 degree free rotation of an implement with respect to the interface.

Yet further, the invention provides an implement interface adapted to accommodate 180 degrees free rotation at a first position of engagement between the implement and the interface, and to prevent rotation at a second position of engagement.

The invention further provides novel implements which accommodate 180 degrees free rotation of the implement about a rotation member having an axis extending between the implement and the vehicle.

The invention provides an implement which has two or more sets of working elements, which sets of working elements have different types of working surfaces for working the ground at different times, in non-concurrent steps.

The invention provides an implement, for attachment to a vehicle having a three-point hitch, through an implement interface, wherein none of the joining means on the implement comprise the sole definition of any part of the top of the implement.

The invention provides a tool assembly comprising an implement interface having front and rear joining means, and an implement joined to the interface, the tool assembly being adapted to accommodate rotation of the implement with respect to the interface.

The invention accommodates such rotation in the tool assembly about a central axis of rotation, which axis extends between the implement and the interface.

The invention further provides a method of coupling, to a vehicle having a three-point hitch, an implement having joining means not adapted to be coupled directly to the three-point hitch, by interposing an appropriate implement interface between the implement and the three-point hitch.

The invention provides a method comprising coupling an implement interface to a three-point hitch and coupling an implement to the implement interface.

The method accommodates release of the implement from securement to the implement interface, to rotate the implement about 180 degrees with respect to the interface, and to re-secure the implement to the interface, all while maintaining at least partial engagement between the implement and the interface.

The invention has been described above with respect to the preferred embodiments. Those skilled in the art will understand that the invention is susceptible of numerous rearrangements, modifications, and alterations without departing from the spirit of the invention. All such arrangements, modifications, and alterations are intended to be within the scope of the appended claims.

Having thus described the invention, what is claimed is:

1. An implement, having a front and a rear, and being adapted for attachment to a vehicle with said front of said implement disposed toward the vehicle, said implement comprising:

(a) a frame, said frame comprising a transverse frame member extending transversely across said implement;

(b) a rotation member extending frontwardly from said transverse frame member, said rotation member being adapted to engage receiving means attached to the vehicle, and to accommodate rotation of said implement with respect to the vehicle, and about an imaginary axis extending between said implement and the vehicle, said rotation member extending frontwardly from said transverse frame member a sufficient distance that, when said rotation member is received, along a first portion thereof, in a receiving means adapted to receive therein more of the length of said rotation member than said first portion, said implement can be securely supported solely by said rotation member and can be rotated in the receiving means without further support of said implement; and (c) joining means, said joining means being adapted to join with cooperating joining means attached to the vehicle, and to thereby prevent rotation of said implement with respect to the vehicle, said rotation member and said joining means being cooperatively adapted such that (i) said rotation member can be partially engaged with the receiving means without joinder of said joining means with the cooperating joining means attached to the vehicle, whereby said implement can be rotated, while in said partially engaged disposition, with respect to a longitudinal axis extending between said implement and said vehicle, and such that (ii) said implement can subsequently be advanced toward said vehicle, thereby being advanced to further engage the receiving means, said advancement of said implement toward said vehicle being effective to accommodate joinder of said joining means with the respective cooperating joining means attached to the vehicle.

2. An implement as in claim 1, said rotation member and said joining means being cooperatively adapted such that, when said implement is joined with the vehicle by means of said joining means and the cooperating joining means attached to the vehicle, and wherein said rotation member is engaged with the receiving means attached to the vehicle, said joining means can be released from the cooperating joining means attached to the vehicle by moving said implement rearwardly of the vehicle while maintaining a partial engagement of said rotation member with the receiving means attached to the vehicle, and, while said rotation member is so partially engaged with the receiving means attached to the vehicle, said implement can be rotated with respect to the vehicle.

3. A tool assembly, comprising:
   (a) an implement interface, said implement interface having a front and a rear and comprising (i) first front joining means elements, said front joining means elements comprising front joining loci, (ii) one or more second rearwardly disposed members defining said rear of said implement interface, and (iii) second rear joining means elements, a first said rear joining means element comprising an elongated tube extending longitudinally along said implement interface, said tube being supported by one said rearwardly disposed member proximate said rear of said implement interface, and being supported by a second support member at a location disposed frontwardly of said one rearwardly disposed member, said rear joining loci, in combination, being adapted to detachably join said implement interface with an implement; and
   (b) an implement, engaged with said implement interface, said implement comprising (i) a frame, said frame comprising a transverse frame member extending transversely across said implement, and (ii) third joining means elements, a first one of said third joining means elements comprising an elongated rotation member extending frontwardly from said transverse frame member, said rotation member being fully received in said tube rear joining means element of said implement interface, a second one of said third joining means elements being engaged with a second one of said second joining means elements, said second one of said third joining means elements being disengageable from said second one of said second joining means elements by moving said implement, from said fully engaged disposition, rearwardly away from said implement interface such that said rotation member remains partially engaged with said tube, whereupon said implement can be freely rotated about said tube.

4. A tool assembly as in claim 3 wherein said rear joining means element comprising said tube extends along a longitudinal axis extending between said front and said rear of said implement interface and thence rearwardly through said implement, whereby said rotation of said implement comprises rotation about said longitudinal axis.

5. A method of attaching an implement to a prime mover vehicle, said method comprising interposing, between said vehicle and said implement, an implement interface, said implement interface having a front and a rear, and comprising (i) one or more first frontwardly disposed members defining said front of said implement interface, (ii) first front joining means elements, said first joining means elements comprising front joining loci, said front joining loci being adapted to detachably join said implement interface with said vehicle, (iii) one or more second rearwardly disposed members defining said rear of said implement interface, and (iv) second rear joining means elements, one said rear joining means element comprising an elongated tube extending longitudinally along said implement interface, said tube being supported by one said rearwardly disposed member proximate said rear of said implement interface, and being supported by a second support member at a location disposed frontwardly of said one rearwardly disposed member, said rear joining loci, in combination, being adapted to detachably join said implement interface with said implement.

6. An implement interface, adapted to be interposed between a vehicle hitch and an implement to be drawn thereby, comprising,
   a frame of extended length having a forward end and a rearward end,
   means adapted to connect said frame at its said forward end to a vehicle,
   means adapted to connect said frame at its said rearward end to an implement,
   said implement connecting means including receiving means supported by said frame and defined as an elongated cylindrical bore extending longitudinally a substantial distance along the length of said frame and substantially centrally thereof, and
   said implement connecting means further including laterally disposed connectors on said frame for cooperation with a said implement when the latter is engaged thereagainst to secure the implement to said implement interface and to prevent rotation of the implement with respect to the vehicle when the implement is so secured to said implement interface,
   whereby, when a first portion of a sufficiently long rotation member on the implement, the rotation member being adapted to be received into said cylindrical bore, and to accommodate rotation of the implement with respect to said implement interface, and about an imaginary longitudinal axis extending between the implement and the implement interface, is received along a first portion thereof into a corresponding first portion of said cylindrical bore, the implement can be securely supported solely by the so engaged first portion of said cylindrical bore, said cylindrical bore and said laterally disposed connectors being cooperatively adapted such that (i) the rotation member on the implement can be partially engaged with said cylindrical bore without joinder of said laterally disposed connectors with cooperating connectors on the implement, and the implement can be rotated, while in the partially engaged disposition, with respect to the longitudinal axis and the implement interface, and such that (ii) the implement can subsequently be advanced further toward said implement interface, thereby to further engage the rotation member in said cylindrical bore, the further advancement of the implement being effective for initial accommodation of joinder of said laterally disposed connectors with the cooperating connectors on the implement.

* * * * *